(12) United States Patent
Schindler

(10) Patent No.: US 6,885,650 B1
(45) Date of Patent: Apr. 26, 2005

(54) METHOD, RADIO COMMUNICATIONS SYSTEM AND MOBILE STATION FOR INFORMATION TRANSMISSION

(75) Inventor: Jürgen Schindler, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 923 days.

(21) Appl. No.: 09/655,287

(22) Filed: Sep. 5, 2000

Related U.S. Application Data

(63) Continuation of application No. PCT/DE99/00422, filed on Feb. 16, 1999.

(30) Foreign Application Priority Data

Mar. 3, 1998 (DE) .......................................... 198 08 948

(51) Int. Cl.$^7$ .............................. H04J 3/16; H04J 3/00; H04Q 7/00; H04Q 7/20
(52) U.S. Cl. ....................... 370/336; 370/280; 370/330; 455/450
(58) Field of Search ................................ 370/336, 328, 370/329, 310, 337, 342, 280, 468, 330, 335, 347, 343, 350, 95.3, 95.1; 455/450, 452, 447, 524, 52; 375/145; H04B 7/005, 7/212, 7/26, 7/24, 7/216; H04J 13/04, 3/16, 1/00, 4/00, 13/02; H04Q 7/20, 7/36, 7/00

(56) References Cited

U.S. PATENT DOCUMENTS

| | | | |
|---|---|---|---|
| 5,020,056 A | | 5/1991 | Chennakeshu |
| 5,291,475 A | * | 3/1994 | Bruckert ...................... 370/330 |
| 5,493,563 A | | 2/1996 | Rozanski et al. |
| 5,594,720 A | * | 1/1997 | Papadopoulos et al. ..... 370/330 |
| 5,602,836 A | * | 2/1997 | Papadopoulos et al. ..... 370/280 |
| 5,844,894 A | * | 12/1998 | Dent .......................... 370/330 |
| 6,016,311 A | * | 1/2000 | Gilbert et al. .............. 370/280 |
| 6,031,827 A | * | 2/2000 | Rikkinen et al. ........... 370/330 |
| 6,041,046 A | * | 3/2000 | Scott et al. .................. 370/319 |

FOREIGN PATENT DOCUMENTS

| | | |
|---|---|---|
| DE | 196 47 629 A1 | 5/1998 |
| EP | 0 720 321 A1 | 7/1996 |
| EP | 639313 B1 * 7/1999 | .......... H04B/1/713 |
| WO | WO 9322850 A1 * 11/1993 | ............ H04B/7/26 |

* cited by examiner

Primary Examiner—Man U. Phan
(74) Attorney, Agent, or Firm—Laurence A. Greenberg; Werner H. Stemer; Gregory L. Mayback

(57) ABSTRACT

Data are transmitted through radio blocks in compliance with a time slot in a method for data transmission between a base station and other radio stations forming part of a radio communications system. In order to establish a connection, spacing between transmitted time slots in a given transmission direction is modified according to a predetermined sequence. Thus, reception in the receiving station of data or measuring sequences eventually available only during this interval is not constantly blocked by the data to be transmitted in that connection at a given recurrent interval within a time slot.

21 Claims, 5 Drawing Sheets

| | | | | |
|---|---|---|---|---|
|  | oi | | | |
|  | V1 (ni) |  V3 (ni) |  V5 (ni) | |
|  | V2 (ni) |  V4 (ni) | | |

METHOD, RADIO COMMUNICATIONS SYSTEM AND MOBILE STATION FOR INFORMATION TRANSMISSION

CROSS-REFERENCE TO RELATED APPLICATION

This is a continuation of copending international application PCT/DE99/00422, filed Feb. 16, 1999, which designated the United States.

BACKGROUND OF THE INVENTION

Field of the Invention

The invention relates to a method, a radio communications system and a mobile station for information transmission. The invention pertains, in particular, to radio communications systems in which information is transmitted by means of radio blocks in accordance with a time pattern.

Information (for example voice, video information or other data) is transmitted in radio communications systems by means of electromagnetic waves via a radio interface between a transmitting and a receiving radio station (base station and mobile station). The electromagnetic waves are in this case transmitted at carrier frequencies which are in the frequency band intended for the respective system. Frequencies in the frequency band around 2000 MHz are intended for future mobile radio networks using CDMA or TD/CDMA transmission methods via the radio interface, for example the UMTS (Universal Mobile Telecommunication System) or other 3rd generation systems. Methods which are known as frequency division multiple access (FDMA), time division multiple access (TDMA) and/or a method known as code division multiple access (CDMA) can be used to distinguish between different signal sources in the receiver.

One particular version of time division multiple access (TDMA) is a TDD (time division duplex) transmission method, in which the transmission takes place both in the uplink direction, that is to say from the mobile station to the base station, and in the downlink direction, that is to say from the base station to the mobile station, using a common frequency channel.

It has become known from German published patent application DE 197 13 667 for both user information and organization information to be transmitted in one timeslot. A mobile station which has been assigned such a timeslot for user information can evaluate the organization information from the same radio cell at the same time. The mobile station is thus not free to evaluate the organization information items for adjacent cells, which are normally transmitted in a defined timeslot. One alternative is known from the GSM mobile radio network. In this case, a dedicated timeslot is reserved only for the organization information, so that a mobile station can decide from frame to frame the base station from which it receives the organization information. The user information is transmitted in other timeslots, which do not change. The position of the information transmission within the time pattern does not change in either case.

U.S. Pat. No. 5,020,056 describes a mobile radio system in which a change of timeslots for the individual connections is carried out in order to reduce synchronous fading. In this way, the interval between the transmitted radio blocks varies from frame to frame for each connection in accordance with a specific sequence.

European published patent application EP 0 720 321 describes a mobile radio system which operates using a TDD method.

U.S. Pat. No. 5,493,563 describes a mobile radio system which operates using a TDMA method. A frequency hopping method is used to assist connection handover.

SUMMARY OF THE INVENTION

The object of the invention is to provide an improved method and improved radio communications systems and mobile stations for information transmission which overcomes the above-noted deficiencies and disadvantages of the prior art devices and methods of this general kind, and in which the radio resources are utilized well, and the capabilities for adjacent cell measurement are improved at the same time.

With the above and other objects in view there is provided, in accordance with the invention, a method of transmitting information between a base station and other radio stations in a radio communications system, which comprises:

transmitting information with radio blocks in a defined time pattern;

varying, for a given connection, an interval between the radio blocks transmitted in a downlink direction in accordance with a predetermined sequence;

providing one timeslot for transmission of organization information in which user information for at least one connection is additionally transmitted; and varying an interval between the transmitted radio blocks of the at least one connection which was originally transmitted in the one timeslot for the organization information, while maintaining unchanged an interval between the radio blocks for the organization information.

In accordance with an added feature of the invention, information is transmitted in the downlink and uplink directions using a common frequency channel, and defining at least one switching point between the downlink direction and the uplink direction within a frame.

In accordance with an additional feature of the invention, the method further comprises additionally receiving with a further radio station, within specific frames, radio blocks with organization information for adjacent base stations.

With the above objects in view there is also provided, in accordance with the invention, a radio communications system, comprising:

a base station for transmitting information to at least one other radio station;

said base station having a control device for compiling radio blocks, in which the information is transmitted in accordance with a time pattern;

wherein said control device is configured such that, for a given connection, an interval between transmitted radio blocks in the downlink direction is varied in accordance with a predetermined sequence;

said based station, in one timeslot, transmitting organization information and user information for at least one connection;

said control device varying an interval between the transmitted radio blocks of the at least one connection originally transmitted in the timeslot for the organization information; while an interval between the radio blocks for the organization information remains unchanged.

It is another object of the invention to avoid interference influences in a connection in a radio cell caused by connections in an adjacent radio cell.

With the above and other objects in view there is provided, in accordance with the invention, a method of transmitting information between a base station and other radio stations in a radio communications system, which comprises:

transmitting information in radio blocks according to a time pattern;
varying, for a connection, an interval between transmitted radio blocks in one transmission direction in accordance with a predeterminable sequence; and
employing different sequences in adjacent radio cells.

With the above objects in view there is also provided, in accordance with the invention, a radio communications system, comprising:
a base station for transmitting information to at least one other radio station;
a control device for compiling radio blocks, in which the information is transmitted in accordance with a time pattern;
said control device being configured such that, for a connection in a radio cell, an interval between the transmitted radio blocks in one transmission direction is varied according to a predeterminable sequence;
wherein said control device utilizes a predeterminable sequence for a respective radio cell different from sequences for adjacent radio cells.

Furthermore, there is provided, in accordance with the invention, a mobile station for transmitting information to a base station, comprising:
a control device for compiling radio blocks, in which the information is transmitted in accordance with a time pattern;
said control device being configured such that, for a connection in a radio cell, an interval between the transmitted radio blocks in an uplink direction is varied according to a predeterminable sequence;
wherein said control device utilizes a predeterminable sequence for a respective radio cell different from sequences for adjacent radio cells.

In each of the above-outlined cases, in the case of the method for information transmission between a base station and other radio stations in a radio communications system, the information is transmitted by means of radio blocks in accordance with a time pattern. However, for a connection, the interval between the transmitted radio blocks in one transmission direction varies in accordance with a sequence which can be predetermined. The information to be transmitted within the connection thus does not always prevent the receiving station from receiving information or measurement sequences which may be available only at this time within the time pattern, at that recurring time within the time pattern.

A further advantage is that this results in better averaging of the interference. The transmission quality is thus also improved.

In order to achieve the first of the objects mentioned above, the radio blocks are transmitted in timeslots which have a standard time duration. A fixed time pattern thus exists, to which the transmission times of the base station and mobile stations can be oriented. The transmission times cannot be selected freely in such a timeslot structure, so that the method according to the invention leads to timeslot rotation.

In order to utilize the radio resources effectively, the invention additionally provides that user information for at least one connection to be transmitted in addition in one of the timeslots which is reserved for transmission of organization information. In this case, the interval between the transmitted radio blocks varies only for the user information.

If the timeslots for organization information are not changed from radio cell to radio cell, then adjacent cell measurement without using a second receiver is possible only using the method according to the invention. Otherwise, the organization information would have to be shifted, at least at certain times.

In order to achieve the second of the objects mentioned above, the sequences differ from radio cell to radio cell. Thus, interference which is caused in specific timeslots by mobile or base stations in adjacent cells does not continuously affect the same connections, and the interference is averaged over a greater number of connections.

According to one development of the invention, the information transmission in the downlink and uplink directions takes place using a common frequency channel, and at least one switching point between the downlink direction and the uplink direction is defined within a frame. The time restrictions for a mobile station are greater in such TDD transmission systems since reception is possible only at certain times within a frame. The method according to the invention is particularly advantageous in this case.

In accordance with again another feature of the invention, the sequence which can be predetermined is set by means of signaling information between the stations involved. In consequence, it is optimally derived from the specific characteristics of the radio cell. Different sequences can advantageously be used in the uplink and downlink directions. For the stated reasons, it is important, particularly in the downlink direction, to support adjacent cell measurement by means of slot rotation. This relates above all to connections in the timeslots with organization information. Such cyclic shifting of the transmission times for a connection is unnecessary in the uplink direction.

It is particularly advantageous for the switching point within a frame having a plurality of radio blocks to be adjustable for both transmission directions. This allows asymmetric distribution of the data rate in the uplink and downlink directions, depending on the requirement at the time. For data transmission services, for example mobile WWW browsers, a greater amount of information often needs to be transmitted in the downlink direction than in the uplink direction. This can be achieved with good spectral efficiency by shifting the switching point in favor of the downlink direction. If subsequently, for example due to voice transmission or due to a large amount of data to be transmitted in the uplink direction, which require symmetrical resource distribution or resource distribution in favor of the uplink direction, an increased data rate is in turn required in the uplink direction, the switching point can be matched to this.

The method according to the invention can be used particularly advantageously for TDD systems in which the frequency channels are broadband channels, and a plurality of signals, which can be distinguished by means of CDMA codes, are transmitted in one frequency channel. In the case of broadband timeslots, it is particularly important to use a timeslot with organization and user information optimally.

Other features which are considered as characteristic for the invention are set forth in the appended claims.

Although the invention is illustrated and described herein as embodied in a method, radio communications system and mobile station for information transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
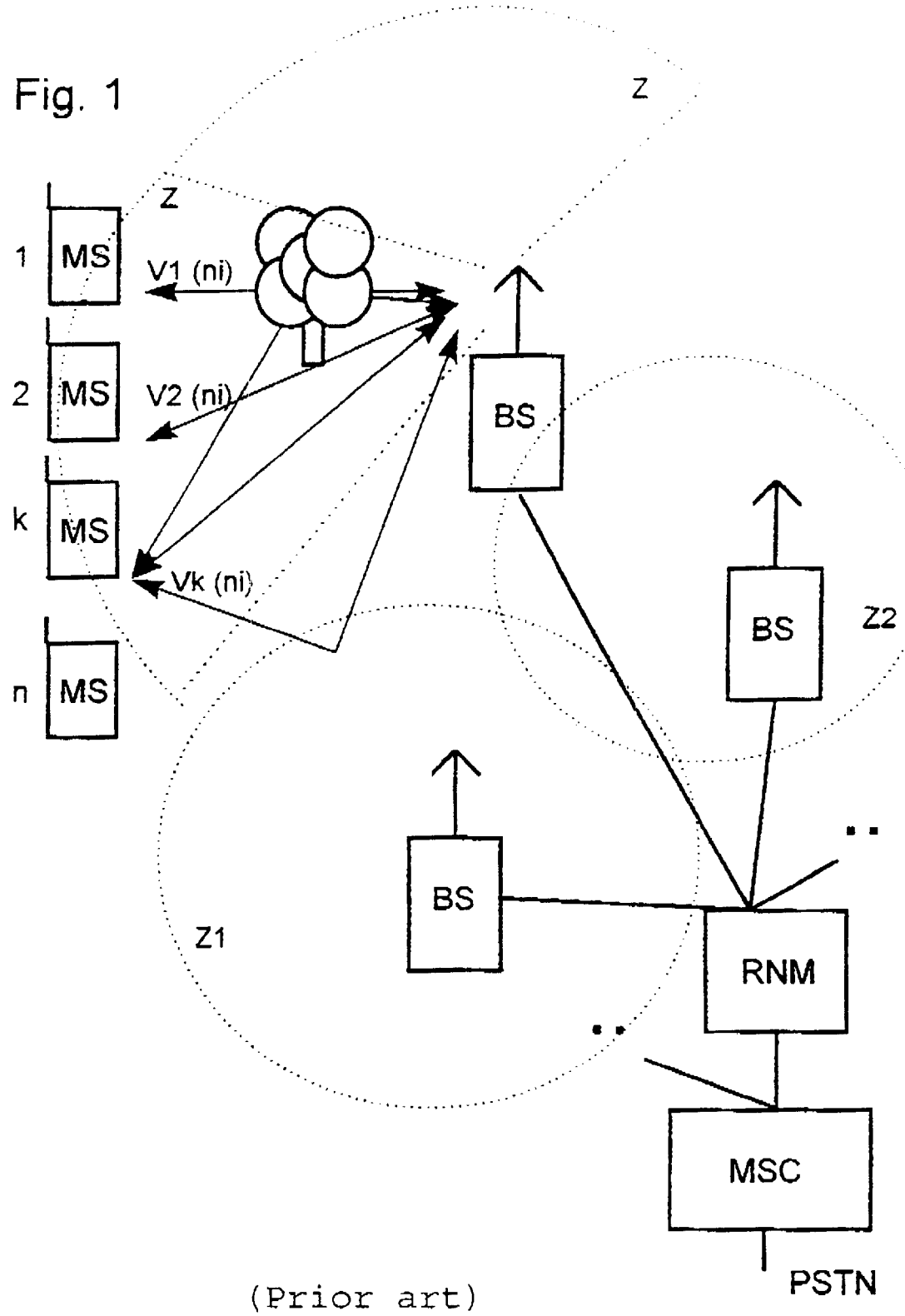
FIG. 1 is a block diagram of a mobile radio network.

Referring now to the figures of the drawing in detail and first, particularly, to FIG. 1 thereof, there is seen a radio communications system with a large number of mobile switching centers MSC which are networked to one another and provide access to a public switched telephone network PSTN. Furthermore, these mobile switching centers MSC are each connected to at least one device RNM for assigning radio resources. Each of these devices RNM in turn allows a connection to at least one base station BS. Such a base station BS can set up a connection via a radio interface to other radio stations, for example mobile stations MS or other mobile and stationary terminals. At least one radio cell Z, Z1, Z2 is formed by each base station BS. With sectorization or hierarchical cell structures, a number of radio cells Z are also supplied by each base station BS.

By way of example, FIG. 1 shows connections V1, V2, Vk for transmitting user information ni and signaling information si between mobile stations MS1, MS2, MSk, MSn and a base station BS. An operation and maintenance center OMC provides control and maintenance functions for the mobile radio network, or for parts of it. The functionality of this structure can be transferred into subscriber access networks with wire-free subscriber access.

Figure 2:
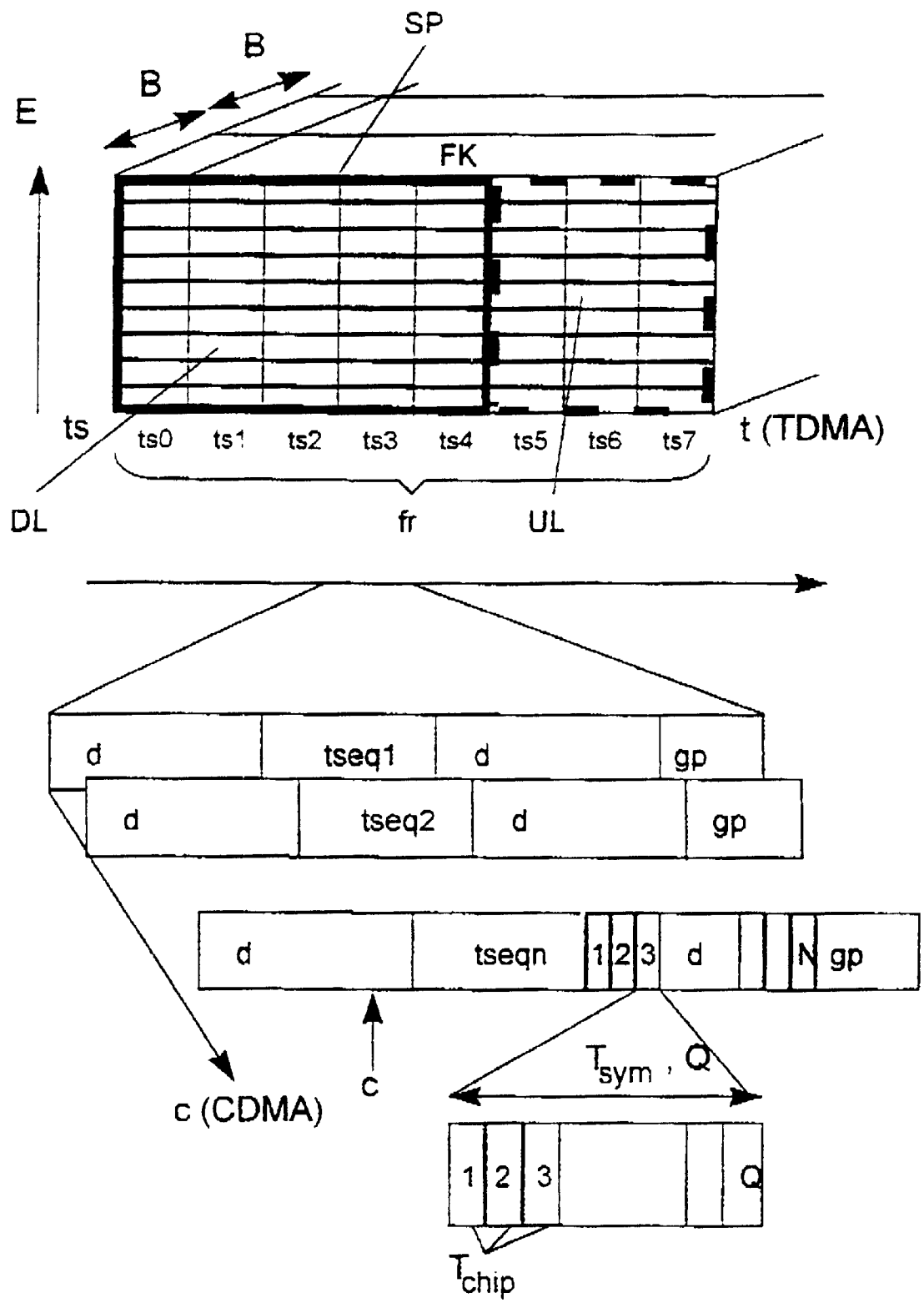
FIG. 2 is a schematic diagram of the frame structure of the TDD transmission method.

The frame structure for radio transmission can be seen in FIG. 2. There, a TDMA component is used to split a broadband frequency range, for example with a bandwidth of B=1.2 MHz, into a plurality of timeslots ts of equal time duration, for example 8 timeslots ts0 to ts7. The frequency range B forms a frequency channel FK. Some of the timeslots, ts0 to ts4, are used in the downlink direction DL, and some of the timeslots ts5 to ts7, are used in the uplink direction UL. In between, there is a switching point SP. The transmission in the downlink DL takes place, for example, before the transmission in the uplink UL. With this TDD transmission method, the frequency channel FK for the uplink direction UL corresponds to the frequency channel FK for the downlink direction DL. This is repeated for other carrier frequencies.

Information from a plurality of connections is transmitted in radio blocks within the frequency channels FK which are provided for information transmission. These radio blocks for user data transmission comprise sections with data d, in which sections with training sequences tseq1 to tseqn, which are known at the receiving end, are embedded. The data d are spread on a connection-specific basis with a fine structure, a subscriber code c, so that, for example, n connections can be separated by means of this CDMA component at the receiving end.

The spreading of individual symbols of the data d means that Q chips of duration $T_{chip}$ are transmitted within the symbol duration $T_{sym}$. The Q chips in this case form the connection-specific subscriber code c. Furthermore, a guard time gp is provided within the timeslot ts in order to compensate for different signal propagation times for the connections.

Within a broadband frequency range B, the successive timeslots ts are structured on the basis of a frame structure. Eight timeslots ts are thus combined to form a frame fr with, for example, one timeslot being used repeatedly by a group of connections. However, it is also possible to form frames with more than eight timeslots, for example 16 or 32 timeslots.

Figure 3:
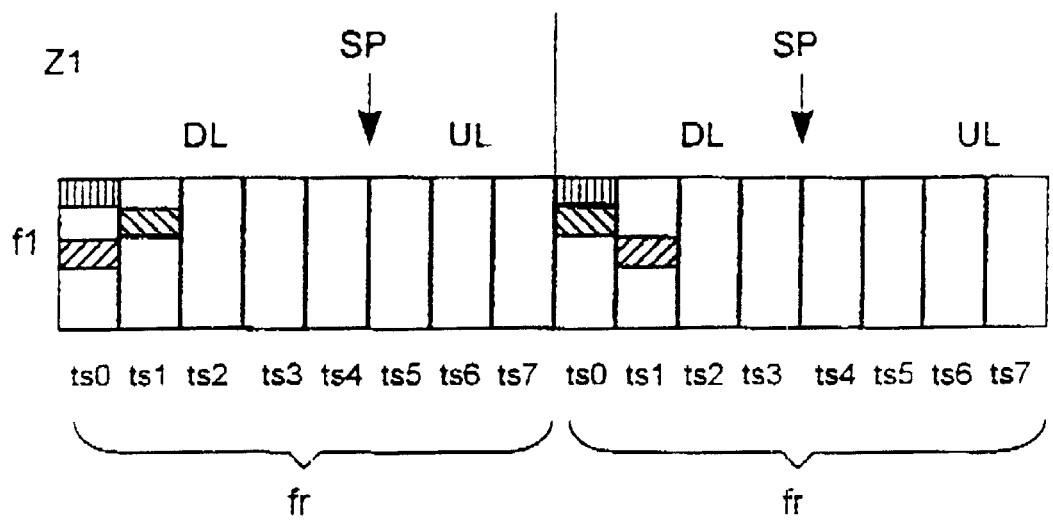
FIG. 3 is a schematic diagram showing the distribution of the connections over the timeslots.
Figure 3:
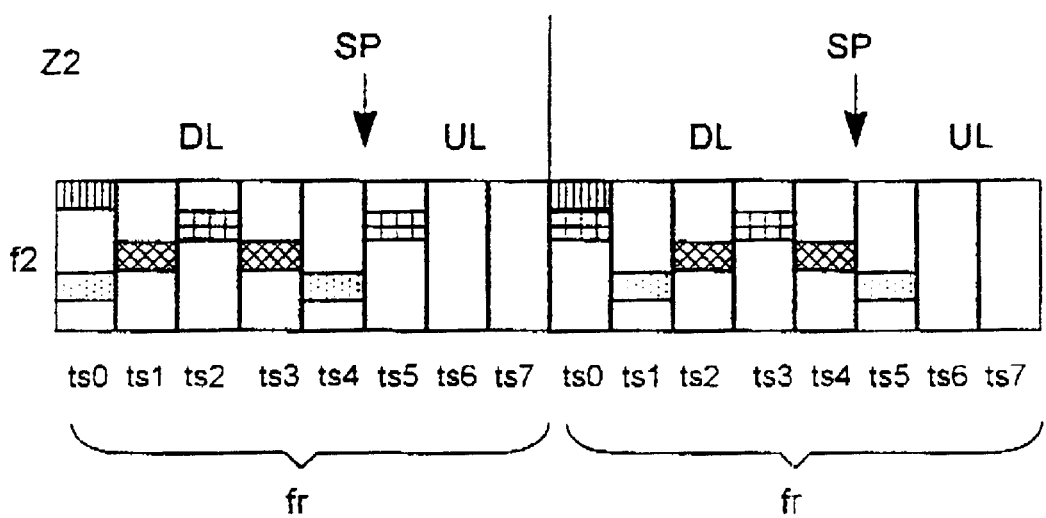
Figure 3:
Figure 3:
Figure 3:
Figure 3:
Figure 3:
Figure 3:

FIG. 3 shows a frame fr with eight timeslots ts0 to ts7 in which, as in FIG. 2, five timeslots ts0 to ts4 are used in the downlink direction DL, and three timeslots ts5 to ts7 are used in the uplink direction UL. A switching point SP marks the transition between the transmission directions within the frame fr. The figure likewise shows that the switching point SP can be shifted within the frame fr. If the switching point SP is placed between the fourth and fifth timeslots ts3, ts4, a greater transmission capacity is available in the uplink direction UL. The radio resources can be distributed optimally to match the instantaneous requirement for transmission capacity.

Organization information oi for a first radio cell Z1 and a frequency channel at a first carrier frequency f1 is transmitted repeatedly in the first timeslot ts0 in the downlink direction DL. For the purposes of an organization channel (BCCH), the organization information contains parameters relating to the carrier frequencies used in the radio cell, and relating to the radio cell identity, etc. Furthermore, the first timeslot ts0 is used for a first connection V1, in which user information ni for this connection V1 is transmitted from the base station BS to a mobile station MS. The second timeslot ts1 is used by a second connection V2. The information for other connections in these timeslots ts0, ts1 is not shown.

The situation for the first and second connections V1, V2 in the downlink direction DL in the next frame fr is as follows. The second connection V2 uses the first timeslot ts0 and the first connection V1 uses the second timeslot ts1. The sequence used as the basis for defining the transmission times thus provides a continuous change between the first two timeslots ts0, ts1 for the connections V1, V2 assigned to these timeslots. It is thus possible for both mobile stations MS involved in the connections V1, V2 to carry out adjacent cell measurement during half of the first timeslots ts0. For example, by monitoring the first timeslot ts0 with the organization channel (BCCH) of a second radio cell Z2 at a different carrier frequency f2 (however, the carrier frequency may also be the same).

If the connections V1, V2 are voice connections, then the shift is carried out only in the downlink direction DL. In the case of a data link, there may be no transmission whatsoever in the uplink direction UL. Alternative options provide for the same sequence to be used, or a different sequence to be set, in the opposite transmission direction (see FIG. 3, bottom). The sequence is also set from the viewpoint that rotating use of a timeslot ts results in the interference sources being averaged over a number of connections. In conjunction with coding and scrambling of the information for one connection over a number of timeslots ts, the probability of the transmitted information being successfully received is thus increased.

The sequence to be used is signaled via the organization information oi, or can alternatively be set individually by means of a signaling interchange between the radio systems MS, BS that art involved.

FIG. 3 also shows a frequency channel for an adjacent radio cell Z2, in which the organization information oi is likewise transmitted continuously in the first timeslot ts0. User information ni from, for example, three connections V3, V4, V5 which are shown is distributed between the timeslots ts0 to ts2 in the downlink direction DL, and the timeslots ts3 to ts5 in the uplink direction UL. The shifting sequence in this case covers three timeslots so that, for example, the connection V3 uses the first timeslot ts0 in the downlink direction DL only for every third frame fr. The rotation takes place in the opposite direction in the uplink direction UL.

There are thus a large number of options for implementing the method according to the invention, with the minimum preconditions being as follows:

the sequence is known to both the base station and the mobile station;

the sequence comprises at least two frames and two timeslots;

in TDD transmission systems, a distinction must be drawn between the uplink and downlink directions.

Figure 4:
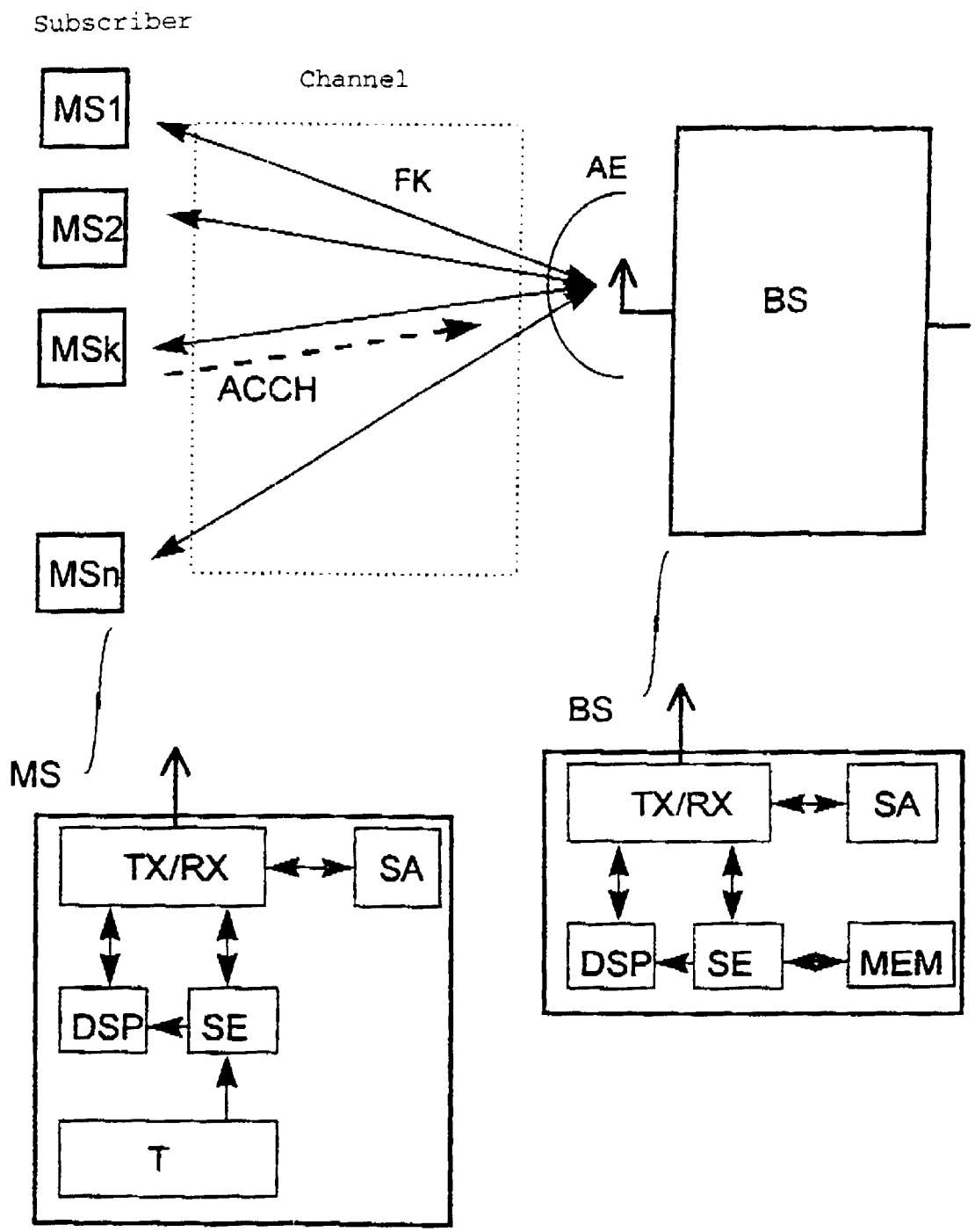
FIG. 4 is a block diagram of a base station and a mobile station.

FIG. 4 shows the information transmission from the base station BS to the mobile stations MS1 to MSn. The mobile stations MS1 to MSn first of all determine one or more frequency ranges with a sufficiently high or maximum received power. These are the frequency ranges of the nearest base station BS in whose cell the mobile station MS is currently located. The base station BS and the mobile station MS are thus assigned.

The base station BS contains a transmitting/receiving device TX/RX which carries out digital/analog conversion of transmission signals to be transmitted, converts them from baseband to the frequency range for transmission, and modulates and amplifies the transmission signals. A signal production device SA has previously collated the transmission signals into radio blocks, and assigned them to the appropriate frequency channel and timeslot. A signal processing device DSP evaluates signals received via the transmitting/receiving device TX/RX, and carries out channel estimation.

For signal processing, the received signals are converted into symbols with a discrete range of values, for example being digitized. A signal processing device DSP which, as a digital signal processor, contains a JD processor for detecting the user information and the signaling information using the JDGR CDMA method (joint detection), evaluates the data parts d. The interaction of the components, the setting of the switching point SP and the assignment of the connections to a timeslot are controlled by a control device SE in the base station BS. Associated data relating to the switching point SP and the specific characteristics of the connection are stored in a memory device MEM.

In an appropriately adapted form, the mobile station MS contains the assemblies explained for the base station BS and, in addition, a control panel T. The subscriber can enter inputs on the control panel T, inter alia an input to activate the mobile station MS or to set up a connection to the base station BS. The control device SE evaluates signals sent in the downlink direction and received by the mobile station MS, determines the received power and the current signal-to-noise ratio at that time and initiates signaling to the base station BS in a signaling channel ACCH, at which point a frequency channel FK and a timeslot ts are assigned for user data transmission.

The switching points SP between the downlink direction DL and the uplink direction UL are defined by the control device SE in the base station BS. The control device SE in the respective transmitting station sets the transmission time for a specific connection, which is influenced by the sequence, the respective station being the mobile station MS for the uplink direction UL and the base station BS for the downlink direction DL.

Figure 5:
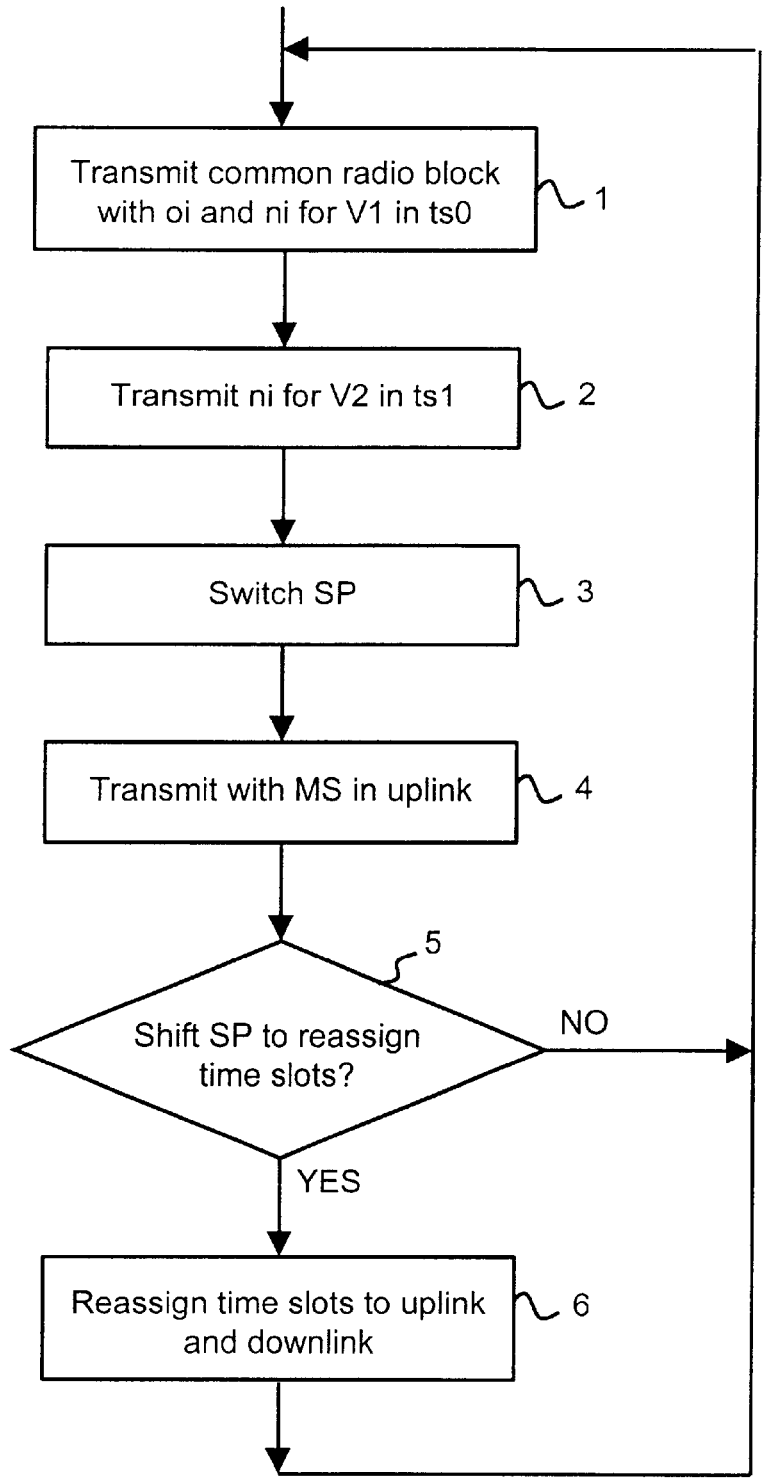
FIG. 5 is a flowchart illustrating the transmission of information.

FIG. 5 shows the information transmission sequence, in highly simplified form. In a first step, with reference to FIG. 3, a common radio block is transmitted for the organization information oi and the useful information ni for the first connection V1 in the first timeslot ts0, by the base station BS in the downlink direction DL.

In a second step, the user information ni for the second connection is transmitted in the second timeslot ts1 by the base station BS. After subsequent switching at the switching point SP in the third step, the mobile station MS now transmits in the uplink direction UL in the frequency channel FK that has already been used. In a fourth step, the mobile stations MS transmit information as required in the uplink direction.

In a fifth step after the end of the frame fr, the sequence is checked. If a change in the assignment of the connections in>the downlink direction to the timeslots is intended for the next frame, then this assignment process is carried out in the correct sequence in a sixth step.

I claim:

1. A method of transmitting information between a base station and other radio stations in a radio communications system, which comprises:

transmitting information with radio blocks in a defined time pattern;

varying, for a given connection, an interval between the radio blocks transmitted in a downlink direction in accordance with a predetermined sequence and setting the sequence with signaling information between the stations;

providing one timeslot for transmission of organization information in which user information for at least one connection is additionally transmitted; and varying an interval between the transmitted radio blocks of the at least one connection which was originally transmitted in the one timeslot for the organization information, while maintaining unchanged an interval between the radio blocks for the organization information.

2. A method of transmitting information between a base station and other radio stations in a radio communications system, which comprises:

transmitting information with radio blocks in a defined time pattern;

varying, for a given connection, an interval between the radio blocks transmitted in a downlink direction in accordance with a predetermined sequence;

providing one timeslot for transmission of organization information in which user information for at least one connection is additionally transmitted;

varying an interval between the transmitted radio blocks of the at least one connection which was originally transmitted in the one timeslot for the organization information, while maintaining unchanged an interval between the radio blocks for the organization information;

transmitting information in the downlink and uplink directions using a common frequency channel, and defining at least one switching point between the downlink direction and the uplink direction within a frame; and utilizing different sequences in the downlink and uplink directions.

3. The method according to claim 1, which comprises additionally receiving with a further radio station, within specific frames, radio blocks with organization information for adjacent base stations.

4. The method according to claim 1, which comprises utilizing different sequences in adjacent radio cells.

5. The method according to claim 1, wherein the switching point within a frame having a plurality of radio blocks in both transmission directions is adjustable.

6. The method according to claim 1, which comprises transmitting with broadband frequency channels, with a plurality of signals transmitted simultaneously in one frequency channel, and distinguishing the signals by CDMA codes.

7. A radio communications system, comprising:
   a base station for transmitting information to at least one other radio station;
   said base station having a control device for compiling radio blocks, in which the information is transmitted in accordance with a time pattern;
   wherein said control device is configured such that, for a given connection, an interval between transmitted radio blocks in the downlink direction is varied in accordance with a given sequence set with signaling information between said base station and the other radio station;
   said base station, in one timeslot, transmitting organization information and user information for at least one connection;
   said control device varying an interval between the transmitted radio blocks of the at least one connection originally transmitted in the timeslot for the organization information; while an interval between the radio blocks for the organization information remains unchanged.

8. A method of transmitting information between a base station and other radio stations in a radio communications system, which comprises:
   transmitting information in radio blocks according to a time pattern; and
   varying, for a connection, an interval between transmitted radio blocks in one transmission direction in accordance with a predeterminable sequence and setting the sequence with signaling information between the stations involved.

9. A method of transmitting information between a base station and other radio stations in a radio communications system, which comprises:
   transmitting information in radio blocks according to a time pattern;
   varying, for a connection, an interval between transmitted radio blocks in one transmission direction in accordance with a predeterminable sequence;
   transmitting information in a downlink direction and an uplink direction within a common frequency channel, and defining at least one switching point between the downlink direction and the uplink direction within a frame; and
   utilizing mutually different sequences in the downlink and uplink directions.

10. The method according to claim 8, which comprises transmitting the radio blocks in timeslots having a standard time duration and forming the time pattern.

11. The method according to claim 10, which comprises providing one of the timeslots for transmitting organization information and for additionally transmitting user information for at least one connection.

12. The method according to claim 11, which comprises varying the interval between the transmitted radio blocks only for the user information.

13. The method according to claim 8, which comprises additionally receiving, with another radio station, radio blocks with organization information for adjacent base stations within specific frames.

14. The method according to claim 8, wherein the switching point within a frame having a plurality of radio blocks in both transmission directions is adjustable.

15. The method according to claim 8, which comprises transmitting in broadband frequency channels, with a plurality of signals, and distinguishing the signals with CDMA codes.

16. A radio communications system, comprising:
   a base station for transmitting information to at least one other radio station;
   a control device for compiling radio blocks, in which the information is transmitted in accordance with a time pattern;
   said control device being configured such that, for a connection in a radio cell, an interval between the transmitted radio blocks in one transmission direction is varied according to a given sequence and the given sequence is set with signaling information between the base station and the other radio station;
   wherein said control device utilizes a given sequence for a respective radio cell different from sequences for adjacent radio cells.

17. A mobile station for transmitting information to a base station, comprising:
   a control device for compiling radio blocks, in which the information is transmitted in accordance with a time pattern;
   said control device being configured such that, for a connection in a radio cell, an interval between the transmitted radio blocks in an uplink direction is varied according to a given sequence and the given sequence is set with signaling information between the base station and the mobile station.

18. The mobile station according to claim 17, wherein said control device is configured to employ a predetermined sequence for a respective radio cell different from sequences for adjacent radio cells.

19. A mobile station for transmitting information in a radio communications system, which comprises:
   a control device configured to assemble and transmit information in radio blocks according to a time pattern;
   said control device being further configured to vary, for a connection, an interval between transmitted radio blocks in one transmission direction in accordance with a predetermined sequence;
   said control device being further configured to transmit information in a downlink direction and an uplink direction within a common frequency channel, to define a switching point between the downlink direction and the uplink direction within a frame, and to utilize mutually different sequences in the downlink and uplink directions.

20. The method according to claim 8, which comprises employing different sequences in mutually adjacent radio cells.

21. The method according to claim 9, which comprises employing different sequences in mutually adjacent radio cells.

* * * * *